US012576751B2

(12) United States Patent
Forestier et al.

(10) Patent No.: US 12,576,751 B2
(45) Date of Patent: Mar. 17, 2026

(54) OVERHEAD LINE SYSTEM FOR CONSTRUCTION MACHINES FOR PIECE GOOD AND BULK MATERIAL TRANSPORT AND CONSTRUCTION MACHINE

(71) Applicant: LIEBHERR-MINING EQUIPMENT COLMAR SAS, Colmar Cedex (FR)

(72) Inventors: Cedric Forestier, Sausheim (FR); Kai Kugelstadt, Lahr (DE)

(73) Assignee: LIEBHERR-MINING EQUIPMENT COLMAR SAS, Colmar Cedex (FR)

( * ) Notice: Subject to any disclaimer, the term of this patent is extended or adjusted under 35 U.S.C. 154(b) by 882 days.

(21) Appl. No.: 17/754,421

(22) PCT Filed: Aug. 17, 2020

(86) PCT No.: PCT/EP2020/072966
§ 371 (c)(1),
(2) Date: Mar. 31, 2022

(87) PCT Pub. No.: WO2021/063586
PCT Pub. Date: Apr. 8, 2021

(65) Prior Publication Data
US 2022/0297574 A1 Sep. 22, 2022

(30) Foreign Application Priority Data

Oct. 2, 2019 (DE) ..................... 10 2019 126 557.6

(51) Int. Cl.
*B60M 7/00* (2006.01)
*B60L 5/04* (2006.01)
*B60M 1/12* (2006.01)

(52) U.S. Cl.
CPC ................. *B60M 7/00* (2013.01); *B60L 5/04* (2013.01); *B60M 1/12* (2013.01); *B60L 2200/40* (2013.01)

(58) Field of Classification Search
CPC ... B60M 7/00; B60M 1/12; B60L 5/04; B60L 2200/40
See application file for complete search history.

(56) References Cited

U.S. PATENT DOCUMENTS

| | | | | |
|---|---|---|---|---|
| 10,793,006 B2 * | 10/2020 | Kerscher | ................. | B60L 50/53 |
| 2010/0235006 A1 * | 9/2010 | Brown | .................. | B60L 53/126 |
| | | | | 700/286 |

(Continued)

FOREIGN PATENT DOCUMENTS

| | | |
|---|---|---|
| CN | 103237676 A | 8/2013 |
| CN | 103492216 A | 1/2014 |

(Continued)

OTHER PUBLICATIONS

ISA European Patent Office, International Search Report Issued in Application No. PCT/EP2020/072966, Oct. 26, 2020, WIPO, 5 pages.

(Continued)

*Primary Examiner* — Jason C Smith
(74) *Attorney, Agent, or Firm* — McCoy Russell LLP

(57) ABSTRACT

The disclosure relates to an overhead line system for supplying electricity to the drive of one or more construction machines for piece good or bulk material transport, wherein the overhead line comprises at least one pair of lines which extend parallel along the route, carry current with opposing polarity and which can be electrically contacted by corresponding current collectors of the construction machines, characterized in that each line is provided at the end with at least one guide forming a feed channel for receiving the head of the current collector, the feed channel converging in the direction of the associated line.

20 Claims, 13 Drawing Sheets

(56)     References Cited

U.S. PATENT DOCUMENTS

| | | | | |
|---|---|---|---|---|
| 2014/0097054 A1 * | 4/2014 | Francke | .................... | B60L 5/19 |
| | | | | 191/59.1 |
| 2014/0195091 A1 * | 7/2014 | Saito | ........................ | B60L 5/08 |
| | | | | 701/22 |
| 2016/0046206 A1 * | 2/2016 | Murase | ..................... | B60L 9/00 |
| | | | | 191/33 R |
| 2019/0232796 A1 * | 8/2019 | Applegate | ................. | B60L 7/10 |
| 2022/0297574 A1 * | 9/2022 | Forestier | ................... | B60L 5/36 |
| 2023/0050922 A1 * | 2/2023 | Moelle | ..................... | B60L 5/24 |

FOREIGN PATENT DOCUMENTS

| | | | | | |
|---|---|---|---|---|---|
| CN | 103547473 | A | | 1/2014 | |
| DE | 19948108 | A1 | | 4/2001 | |
| DE | 10256705 | A1 * | 7/2004 | ................ | B60L 5/36 |
| DE | 102011076623 | A1 | | 11/2012 | |
| DE | 202017006645 | U1 | | 3/2018 | |
| DE | 102020207211 | A1 * | 6/2021 | | |
| EP | 1086845 | A1 | | 3/2001 | |
| GB | 1341611 | A | | 12/1973 | |
| JP | 2000050406 | A | | 2/2000 | |
| WO | WO-2010094140 | A1 * | 8/2010 | .............. | B60L 53/14 |
| WO | WO-2014202103 | A1 * | 12/2014 | .......... | B60L 11/1816 |
| WO | WO-2020254329 | A1 * | 12/2020 | ................ | B60L 5/36 |

OTHER PUBLICATIONS

National Intellectual Property Administration of the People's Republic of China, Office Action and Search Report Issued in Application 202080069989.5, Feb. 26, 2025, 21 pages.

* cited by examiner

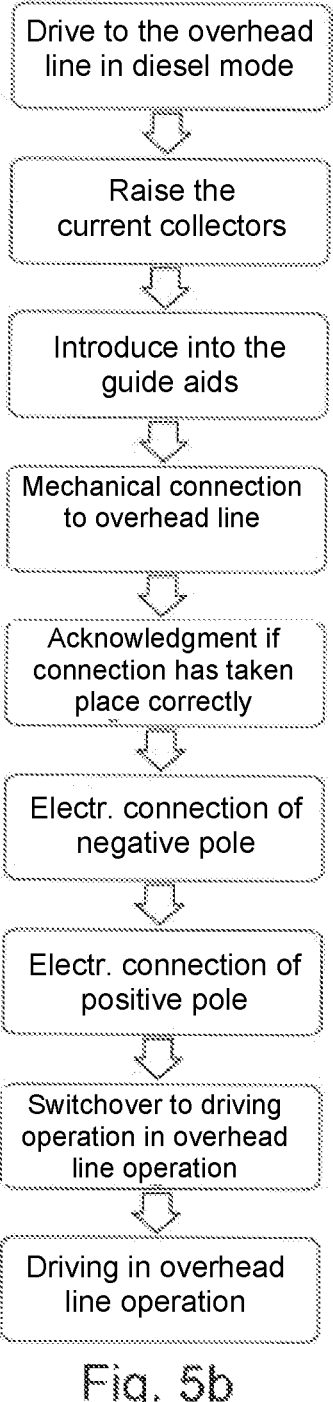

Drive to the overhead
line in diesel mode

Raise the
current collectors

Introduce into the
guide aids

Mechanical connection
to overhead line

Acknowledgment if
connection has taken
place correctly

Electr. connection of
negative pole

Electr. connection of
positive pole

Switchover to driving
operation in overhead
line operation

Driving in overhead
line operation

Fig. 5b

OVERHEAD LINE SYSTEM FOR CONSTRUCTION MACHINES FOR PIECE GOOD AND BULK MATERIAL TRANSPORT AND CONSTRUCTION MACHINE

CROSS REFERENCE TO RELATED APPLICATIONS

The present application is a U.S. National Phase of International Application No. PCT/EP2020/072966 entitled "OVERHEAD LINE SYSTEM FOR CONSTRUCTION MACHINES FOR PIECE GOOD AND BULK MATERIAL TRANSPORT AND CONSTRUCTION MACHINE," and filed on Aug. 17, 2020. International Application No. PCT/EP2020/072966 claims priority to German Patent Application No. 10 2019 126 557.6 filed on Oct. 2, 2019. The entire contents of each of the above-listed applications are hereby incorporated by reference for all purposes.

TECHNICAL FIELD

The disclosure relates to an overhead line system for the electrical supply of the travel drive of one or more construction machines for unit load and bulk load transport, wherein the overhead line comprises at least one line pair that runs in parallel along the driving route, that carries current of opposite polarity, and that can be electrically connected by corresponding current collectors of at least one construction machine.

BACKGROUND AND SUMMARY

The electrification of construction machinery for the movement of unit and bulk loads is becoming an increasingly relevant topic, in particular in the field of mining or strip mining, where unchanging transport routes are traveled at the highest possible frequency. The dump trucks used there having very high load volumes, i.e. 100 t and more, are largely provided with diesel-electric transmissions in which an internal combustion engine drives an integrated generator that in turn delivers the electrical energy for the electric drive motors.

In strip mining, the dump trucks cover longer driving routes with a straight-line extent from the loading position to the destination. To reduce diesel consumption and the $CO_2$ emission of the vehicle fleet, the driving section having a straight extent is equipped with an overhead line system for the vehicles. The vehicles themselves can tap the required energy for the supply of the electric driving motors in this sector with the aid of their installed current collectors. In addition to the significantly saved diesel consumption, a power increase can optionally also be achieved and the trip time reduced.

Due to the predominantly straight route extent, pantographs are installed as current collectors since they also permit a simple and fast mechanical contacting of the overhead line during the driving movement. There is, however, a disadvantage in this technology that said current collector type requires a straight-line route extent and is thus not suitable for routes having tight corners such as is as a rule the case in mining with serpentine mountain roads.

There has, however, been the desire in the recent past also to provide a suitable external supply with electric energy for the dump trucks used there. The object of the present disclosure therefore deals with the development of a suitable overhead line system for serpentine route extents and of construction machinery having suitable current collectors.

This object is achieved by an overhead line system.

In accordance with the disclosure, it is proposed to provide an overhead line system for construction machinery having current collectors that each have a pole with a current collector head at the end side for contacting a single line. The current collector heads can be equipped with a collector shoe, a roller, or similar and are pressed toward the line from below and are guided by the collector shoe, the roller, etc. Such a collector shoe, for example, comprises a half-groove/rounded portion that is brought into contact with the round power line/cable. The aforesaid current collector type is also suitable for overhead lines having a serpentine extent. The mechanical connection, however, requires a pinpoint alignment of the current collector heads toward the associated overhead line during the connecting phase, which makes an exact positioning of the construction machine below the overhead line necessary during this connecting phase. This has previously been practically impossible to implement during the driving movement so that the vehicles have previously been stopped beneath the overhead line to be able to align the current collectors with the overhead line unhurriedly. The enforced stop associated therewith prolongs the cycle time for a charge and discharge process, however, which is not desired or acceptable from an economic viewpoint with the comparatively high investment sums in the vehicle fleet. Every braking and accelerating process in mining operation furthermore means an impairment of the efficiency of the entire mining process. In addition to the increased demand on the driving route and the vehicle tires this causes, the total energy requirement also increases.

Against this background, it is proposed in accordance with the disclosure to provide the lines that run in parallel and that conduct potential of opposite polarity with suitable guide aids that assist and thereby greatly simplify the exact positioning and alignment of the current collectors with the overhead line. A simple contacting is ideally also hereby made possible during the driving movement of the construction machine.

The guide aid forms a supply channel that is open to the bottom due to its walls and that extends from the end of the guide aid at the front side up to the oppositely disposed end of the guide aid with the line joining there. The line can, for example, be guided in the region of the supply channel above the guide aid and is only guided back to the bottom again in the end region of the guide channel to enable the contact with the current collector here. The head of the current collector introduced into the supply channel is guided within the supply channel in the direction of channel up to the line joining at its end. In this respect, the channel shape becomes narrower or converges toward the joining overhead line in the direction of travel, i.e. the cross-sectional profile of the supply channel reduces in the direction of the overhead line. The introduction of the corresponding current collector head into the supply channel is simplified by the initial large channel width of the guide aid. The channel shape that becomes narrower in the direction of travel provides the exact alignment of the current collector head to the overhead line joining it so that the collector shoe, the roller, or other contact means of the current collector head runs along the lower side of the line from the supply channel of the guide aid.

In accordance with an embodiment, the guide aid(s) has/have a widened portion of the width of the supply channel that is directed outwardly, i.e. away from the adjacent line pair. A side wall of the guide wall that extends in parallel with the line is in particular provided while the oppositely disposed wall is oriented from the outside in the direction of the line and thereby forms the desired reduction of the channel width in the line direction. The shape of the guide aid does not impede the adjacent line pair so that the overhead line can be guided with a constant line spacing throughout.

It is, however, likewise conceivable that the channel width is widened symmetrically to the center axis of the guide aids and converges in the direction of the line toward the center axis of the guide aid.

In accordance with an embodiment, the guide means of the lines extending in parallel can be arranged offset from one another in the direction of travel. A mechanical and also electrical contact of the current collector heads of the construction machine delayed in time can be made possible by the offset arrangement. The guide aid of the line having a positive potential is ideally arranged after the guide aid of the negative line in the direction of travel so that initially an electric connection to the negative potential is formed.

There is equally the possibility that the guide aids of a line pair are arranged at the same level next to one another viewed in the direction of travel. Provision can optionally be made in such an embodiment that the spacing of the center axes of both guide aids is selected as larger than the spacing of the overhead line pair.

In accordance with an embodiment, the channel width of the guide aid reduces from its channel opening at the front side in the direction of the joining overhead line. The larger the channel opening width, the larger the lateral deviation of the alignment of the current collector head to the line extent can be. Ideally additionally to this, but also alternatively to it, the channel height can also be converging in the direction toward the line start. In the ideal case, the channel of the guide aid displays a conical extent in the axial direction, i.e. in the direction of travel. The guide aid or the channel is open at its lower side, i.e. the side facing the ground for the polarity poles of the current collector head.

The spacing of the two lines of the overhead line system extends over the total driving route in parallel at an almost constant spacing as a rule. Provision can, however, be made In accordance with a particular embodiment of the disclosure that the spacing of both lines from one another is increased in the region of a guide aid to hereby leave room for the dimensioning of the guide aid transversely to the direction of travel. This allows a design of the guide aid having a channel width that is as large as possible; the initial channel width is in particular larger than the regular spacing between the line pair.

The first line that extends in parallel with the guide aid of the second line can be lowered laterally toward the outside to increase the spacing and can be conducted back after the guide aid in the direction of travel to reduce the spacing to the normal amount again.

Provision can be made to assist the operator of the construction machine during the positioning for overhead line operation that the driving ground is provided with one or more visual marks as a conducting aid in the region below at least one guide aid or shortly before it. A corresponding visual guidance system is, for example, suitable that already draws the attention of the operator to the required alignment and positioning of the construction machine below the overhead line system at an early time. Such a system can, in its simplest variant, comprise one or more graphical marks applied to the driving ground. it is equally conceivable to instead work with optical projections onto the driving ground. A use of suitable illuminants is also conceivable to implement a beacon known from maritime applications. Illuminants, in particular LEDs, generate one or more colored light regions to mark a desired travel corridor for the construction machine. Such a system can also assist the operator during the trip to drive the vehicle below the power line as far as possible. This can also takes place via the presentation of the position of the vehicle with respect to the power line on a screen. Optionally with the emphasizing of the permitted lateral deviations—visually or also acoustically. This can also contribute to an autonomous driving/steering control.

In addition to the overhead line system in accordance with the disclosure, the present disclosure relates to a construction machine, in particular to a construction machine for mining and/or strip mining, that is characterized by electric driving operation. In accordance with the disclosure, such a construction machine, unlike previously known vehicles, has pole current collectors having at least two separate current collector heads. In accordance with the disclosure, these pole current collectors are actively movable in both the vertical and the horizontal directions, i.e. transversely to the direction of travel by means of suitable drives. The individual pole current collectors can ideally be adjusted independently of one another in both the vertical and horizontal directions. Such a construction machine is thereby suitable for overhead line operation with a serpentine extent of line. Such a construction machine is in particular suitable for operation with an overhead line system in accordance with the present disclosure. In addition to the active adjustment possibility, a passive adjustment in the vertical and/or horizontal direction may also be possible, such as by a force application of the overhead line system.

The pressing of the current collectors onto the overhead line takes place during the trip. A suitable system can be provided for this purpose that provides an automatic compensation of horizontal and/or vertical vehicle movements relative to the power line, for example caused by steering movements and/or due to the uneven road surface. A mechanical system is conceivable here that is optionally hydraulically and/or electrically assisted.

In an embodiment of the construction machine, it is designed as a dump truck having a dump bed that can be tipped up for receiving unit load or bulk load. The received unit load or bulk load and the tipping mechanism of the dump bed impair the installation of the current collectors at the roof side (at the upper vehicle side). Instead, in accordance with an embodiment, it is proposed to in particular install the polarity poles having the heads, in particular collector shoes at the end side, in an articulated manner at the vehicle front. The polarity poles for overhead line operation can be raised by means of the articulated connection. The polarity poles can be lowered and placed on the vehicle for the autonomous operation of the construction machine; they can in particular be adjusted about a horizontal axis transversely to the direction of travel. Certain lateral deflections of the vehicle position with respect to the longitudinal direction of the overhead line can be compensated by an additional degree of freedom of the polarity poles about an axis in the direction of travel since the polarity poles can then be inclined actively and passively to the right or left, viewed in the direction of travel, for example.

An arrangement of the polarity poles at the construction machine offset laterally to the operator's cabin will not to impair the field of view of the operator by the polarity poles. In the ideal case, the arrangement is offset from the operator's cabin on the side of the road margin. This then allows the best vision conditions for the operator and the power line can be set up with a short overhang from the power line supports.

A carrier rack may be constructed for the articulated connection of the polarity poles which can be rigidly installed at the vehicle front and may comprise a mounting platform for the articulated connection of the polarity poles. The carrier rack comprises a plurality of carrier poles in accordance with an embodiment. Ideally, at least two carrier poles are installed at the front lower edge of the vehicle frame, while at least two carrier poles are fastened to the upper edge, for example on the platform of the dump truck. The carrier poles extend obliquely upward to the front from the vehicle front. The free ends of the carrier poles may converge toward the common mounting platform for the polarity poles.

Provision can furthermore be made that the construction machine has a projecting roof in the region of the vehicle front. In accordance with a conventional design of dump trucks, the dump bed projects over a vehicle platform in the region of the vehicle front. Since a lowering of the current collector heads below the projecting roof is desirable, the projecting roof can be provided with a corresponding cutout at this point. The current collector heads can in particular be lowered onto a mounting apparatus disposed below the projecting roof. relationship between the vehicle length and the polarity pole length can thereby be optimized. The cutout of the dump bed also makes a shorter construction of the vehicle possible, whereby driving tight radii in conjunction with an adjustment possibility of the current collectors is made possible.

Due to the lowering of the current collector heads below a projecting roof, they are disposed protected from environmental influences. The service friendliness is furthermore improved by the placing down of the current collector heads since the current collector heads are simply accessible via the vehicle platform for service and repair purposes. The current collector heads are frequently equipped with wear components that have to be regularly replaced. The collector shoes must be named here.

A modification of the projecting roof in the region of the cutout is of use, in particular with an elevated edge sill to prevent the rolling off of unit loads and bulk loads over the edge of the cutout and the falling down of the stones onto the current collectors disposed thereunder.

The polarity poles of the construction machine first have to be raised for the transition into overhead line operation, with this also being able to take place with a time delay in the case of the overhead line system in accordance with the disclosure. Ideally, the construction machine comprises a suitable control unit that triggers an automatic raising of the polarity poles as soon as the construction machine has adopted a corresponding position below the overhead line or the operator has issued a manual control command. The same may apply on the transition from overhead line operation into autonomous operation. The control unit can equally carry out a horizontal displacement of the current collector heads automatically for a suitable alignment with the overhead line during the transition into electric operation or also afterward during electric driving operation. In some embodiments, no active adjustment of the current collectors in the horizontal and/or vertical directions may take place at the power line during the trip. Instead, only a passive connection by the contact pressure takes place.

It is conceivable that one or more mirrors and/or cameras are provided at the construction machine that allow the operator to monitor the proper contacting of the current collectors at the overhead line.

It is equally conceivable that the construction machine assists with a visual system to assist the vehicle operator during the connecting process of the current collectors to the overhead line and/or during driving operation in overhead line mode. The operator is also assisted by the latter during the trip to drive the vehicle below the power line as far as possible. This can also takes place, for example, via the presentation of the position of the vehicle toward the power line on a screen. Optionally with the emphasizing of the permitted lateral deviations—visually or also acoustically. An implementation of an autonomous driving/steering operation in overhead line operation is also conceivable.

In addition to the actuation of the actuators for the current collectors, the control unit also controls the internal power electronics of the construction machine to switch the electrical supply of the drive motors from the internal source to the external supply by the overhead line. The same optionally applies to any recuperation operation of the vehicle.

In some embodiments, the construction machine is designed as a dump truck having a load volume of approximately 50 t to 200 t, such as between 80 t and 150 t, ideally approximately 100 t.

A total system comprising an overhead line system, in particular in accordance with said disclosure, and at least one construction machine in accordance with the above embodiments is equally covered by the disclosure. The active adjustment possibility of the current collector poles or current collector heads in both the vertical and horizontal directions enables a universal deployment possibility for the most varied overhead line systems.

Finally, the particular use of the aforesaid total system for the supply of at least one construction machine with electric energy on a mountain road is also covered by the disclosure. The system in particular deploys its full potential on mountain roads with tight corners.

BRIEF DESCRIPTION OF THE FIGURES

Further properties of the disclosure will be explained in more detail in the following with reference to an embodiment shown in the Figures. There are shown:

FIG. 5b: the flowchart diagram during the switchover of the construction machine from diesel-electric transmission to overhead line drive with an overhead line system having guide aids arranged in parallel;

DETAILED DESCRIPTION

Figure 1:
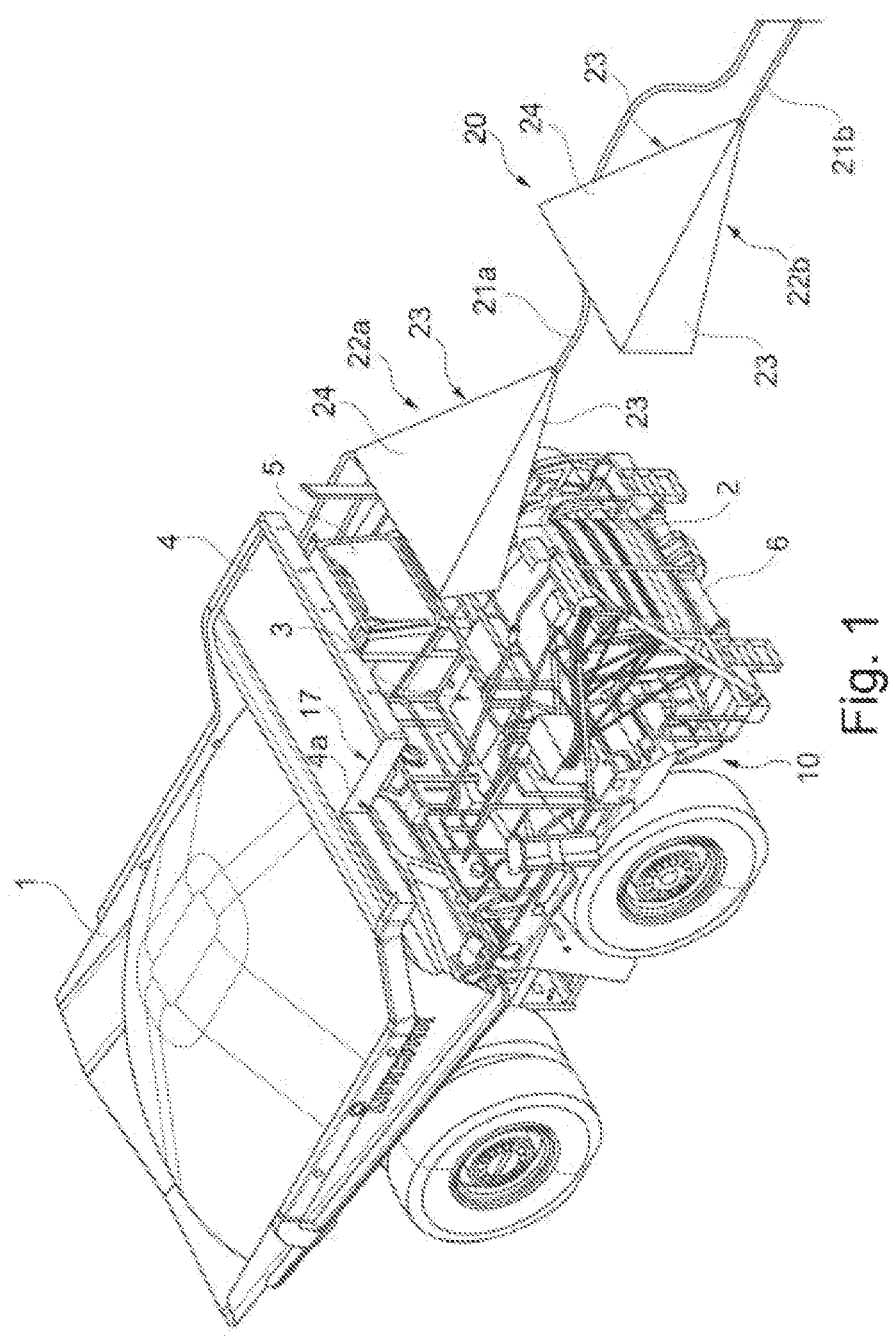
FIG. 1: a perspective side view of the dump truck in accordance with the disclosure with a part of the innovative overhead line.
Figure 2:
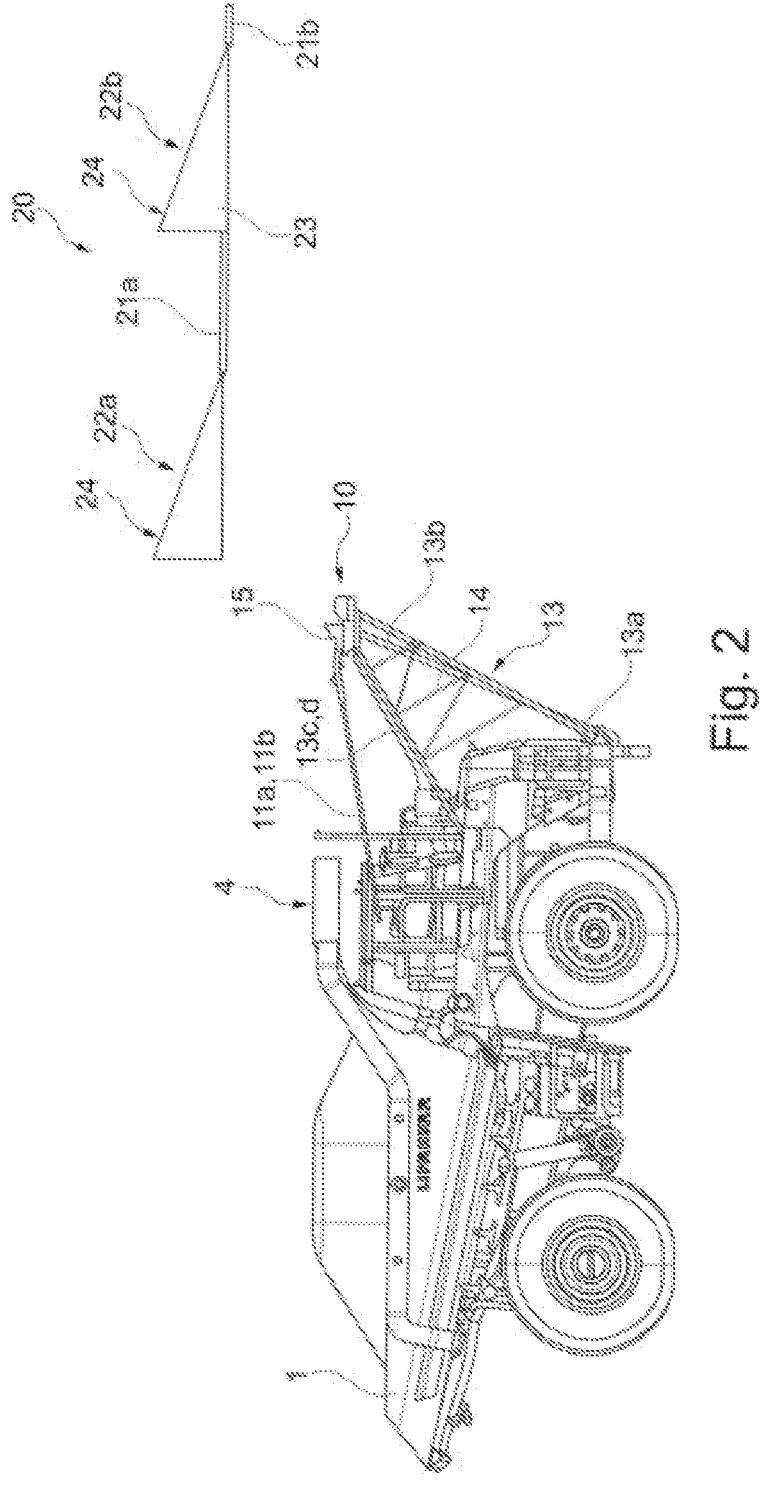
FIG. 2: a side view of the dump truck in accordance with FIG. 1.

FIGS. 1 to 4 show sketched representations of the dump truck in accordance with the disclosure whose travel drive is substantially based on a diesel-electric principle. The installed diesel unit drives a power generator that feeds the at least twp. electric motors of the rear axle of the dump truck. The hydraulics of the vehicle for inter alia raising and lowering the dump bed 1 hangs on the output of the diesel engine via a branch transmission. The dump truck shown belongs to the category of so-called small or mid-size trucks having a load volume of 100 t on average. A vehicle platform 3 is provided at the vehicle front above the radiator 2 and the operator's cabin 5 is inter alia located thereon. A planar surface of the dump bed projects over the platform 3 in the form of a projecting roof 4.

The vehicle shown should in particular be used on serpentine mountain roads in mining, with there being the desire for an optional external electric supply of the electric travel drive by means of an overhead line. For the current collection for overhead line operation, the dump truck comprises pole current collectors 10 having the two polarity poles 11*a*, 11*b* at whose free ends or current collector heads collector shoes 12*a*, 12*b* are provided for the mechanical contact with the power lines 21*a*, 21*b* of the overhead line system 20 that extend in parallel. The collector shoes as a rule comprise a replaceable carbon collector piece. The collector shoes 12*a*, 12*b* each comprise a half-groove/rounded portion that is pressed via the polarity poles 11*a*, 11*b* onto the lines 21*a*, 21*b* from below. After the successful mechanical contact with the lines 21*a*, 21*b* the electrical energy of the overhead line can be tapped for the supply of the internal travel drive of the dump truck via the electrical connection line of the polarity poles 11*a*, 11*b*.

In autonomous operation of the dump truck without supply from the overhead line 20, the polarity poles 11*a*, 11*b*, respectively the current collector heads 12*a*, 12*b*, are placed onto a mounting apparatus 16 below the projecting roof 4 in the region of the platform 3. The articulated connection of the polarity poles 11*a*, 11*b* at the vehicle front of the dump truck required for this purpose takes place with the aid of a carrier structure 13 comprising the four carrier poles 13*a*-13*d* of which two carrier poles 13*a*, 3*b* are mounted at the lower edge 6 of the vehicle frame and two further carrier poles 13*c*, 13*d* on the platform 3. The carrier poles extend from the vehicle front obliquely upwardly and converge at the end side. The transverse struts 13 connecting carrier poles 13*a*-13*d* increase the stability of the carrier structure 13. The polarity poles 11*a*, 11*b* are arranged in an articulated manner on a mounting platform 15 provided at the converging end of the carrier poles 13*a*-13*d*, and indeed pivotable about a horizontal axis transverse to the direction of travel and optionally about a horizontal axis extending in parallel with the direction of travel. An installed actuator system allows the controlled raising or lowering of the polarity poles 11*a*, 11*b* to be able to switch the dump truck over between diesel-electric operation and overhead line operation. At the same time, the polarity poles can also be actively pivoted laterally about the horizontal axis extending in parallel with the direction of travel by means of a drive. The current collectors 10 are as a rule only actively moved by the corresponding drives during the connecting process. No active adjustment of the current collectors 10 in the horizontal and/or vertical directions may take place at the power line 20 during the trip. The current collectors 10 are, however, more or less constantly pressed onto the overhead line during overhead line operation. An automatic compensation of horizontal and/or vertical vehicle movements is also required for this purpose. A mechanical system can be provided for this purpose that is optionally hydraulically and/or electrically assisted.

Figure 3A:
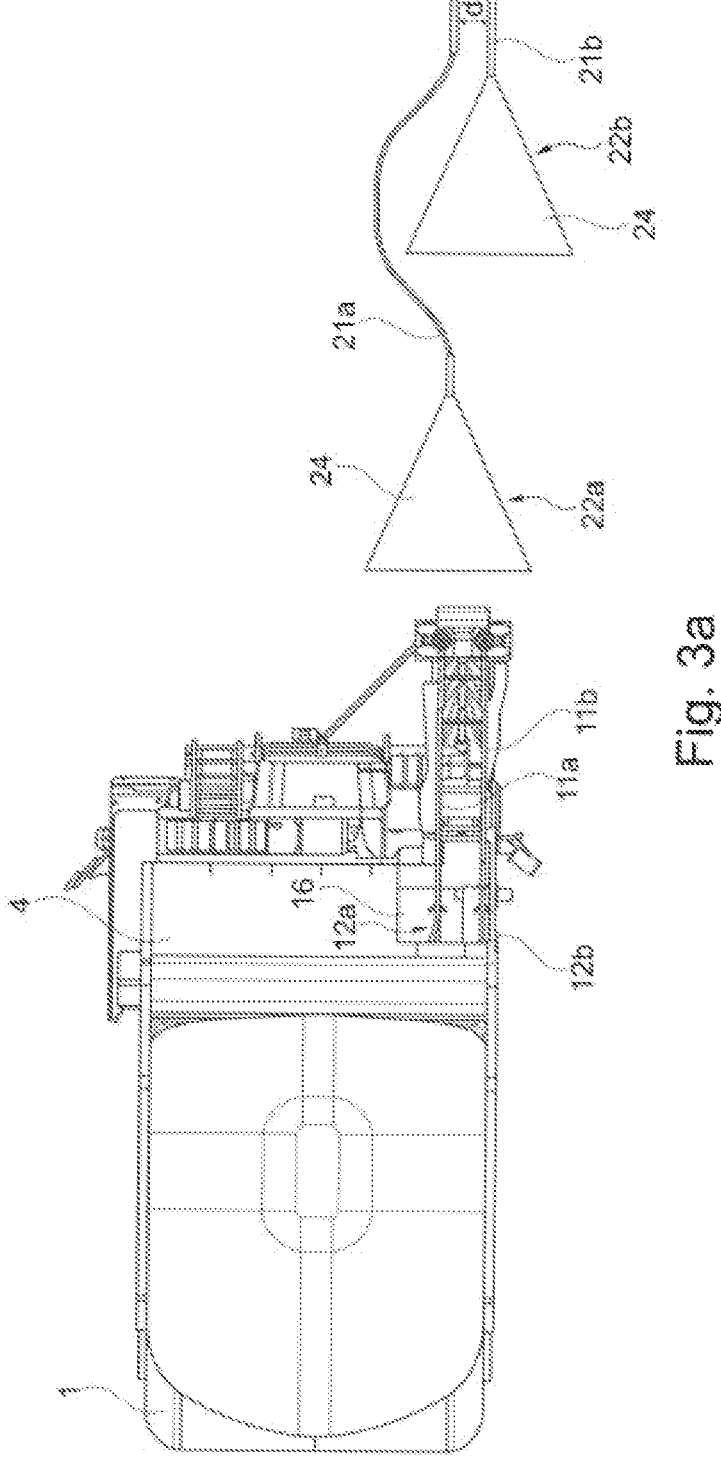
FIG. 3a: a plan view of the dump truck in accordance with FIGS. 1, 2.

It can in particular be seen in FIG. 3 that he current collector heads 12*a*, 12*b* of the polarity poles 11*a*, 11*b* placed on the mounting apparatus 16 are disposed in a protected manner at least partially beneath the projecting roof 4 of the dump bed 1. However, a cutout 4*a* is cut into the projecting roof 4 for the raising and lowering of the polarity poles 11*a*, 11*b*. The elevated margin 17 of the projecting roof 4 prevents bulk load from being able to roll over the projecting roof 4 onto the current collector 11*a*, 11*b* disposed thereunder.

Due to the use of the pole current collectors 10, the dump truck can also be used for overhead lines having a serpentine extent as is necessary, for example, with a mountain road with tight curves in mining. To ensure a simple transition into overhead line operation, where possible without having to stop the dump truck for the connection of the current collectors 10 to the overhead line 20, the overhead line 20 is provided with suitable guide aids 22*a*, 22*b*.

The overhead line comprises a line 21*a* having negative potential and an overhead line 31*b* having positive potential. Said guide aid 22*a*, 22*b*, that is composed of two triangular side walls 23 and one triangular upper side 24 to form a box structure, is arranged at the respective line start. The guide aid 22*a*, 22*b* is open to the front side and to the bottom. The walls 23, 24 form the supply channel that narrows from the front-side channel opening 25 in the direction of the line start, i.e. both the channel width and the channel height reduce in the direction of travel.

The head or collector shoe 12*a*, 12*b* of the unfolded or upwardly extended current collector pole 11*a*, 11*b* is now introduced at the front end or from below into the guide aid 22*a*, 22*b* during the travel movement. Due to the side surfaces 23, 24 converging in the direction of the line, the current collector head 12*a*, 12*b* is guided via the side surfaces until it contacts the line 21*a*, 21*b* precisely and is thereby optimally positioned. The contacting of the current collectors 10 initially takes place mechanically (pressing on) and then electrically.

In the embodiment of FIGS. 1 to 4 and 3*b*, the guide aids 22*a*, 22*b* are additionally arranged behind one another offset in the direction of travel, with the guide aid 22*a* of the line 21 having negative potential being arranged first and the guide aid 22*b* of the positive line 21*b* following in an offset manner. The poles of the current collector 10 of the dump truck are thereby connected to the overhead line 20 with a temporary delay, i.e. the contacting of the negative potential takes place first with the contacting of the positive potential taking place subsequently in time.

This axial offset of the guide aids 22*a*, 22*b* in the direction of the overhead line comprises the former thereby being able to be wider without impeding one another. The width, i.e. the width of the upper side 24, is also selected as larger than the actual spacing di between the lines 21*a*, 21*b* (see FIG. 3). However, for this purpose, the line section of the line 21*a* extending in parallel with the guide aid 22*b* arranged downstream has to be laterally deflected to avoid contact with the guide aid 22*b*.

In the embodiment of FIGS. 1, 2, 3, 4, both side walls 23 run from the outside to the inside so that the channel width reduces symmetrically in the longitudinal direction of the guide aid 22a, 22b. An embodiment of the guide aids 22a, 22b modified for this purpose is shown in FIG. 3b. The inner side walls 23a there extend in parallel with the overhead line 21a, 21b; only the outer side walls 23b are arranged inclined with respect to the overhead line axis and extend from the outside to the inside in the direction of the overhead line 21a, 21b in the longitudinal direction. The channel width of the guide aid 22a, 22b is therefore only increased to the outside so that the spacing of the overhead lines 21a, 21b can also remain unchanged in the region of the guide aids 22a, 22b.

Figure 5A:
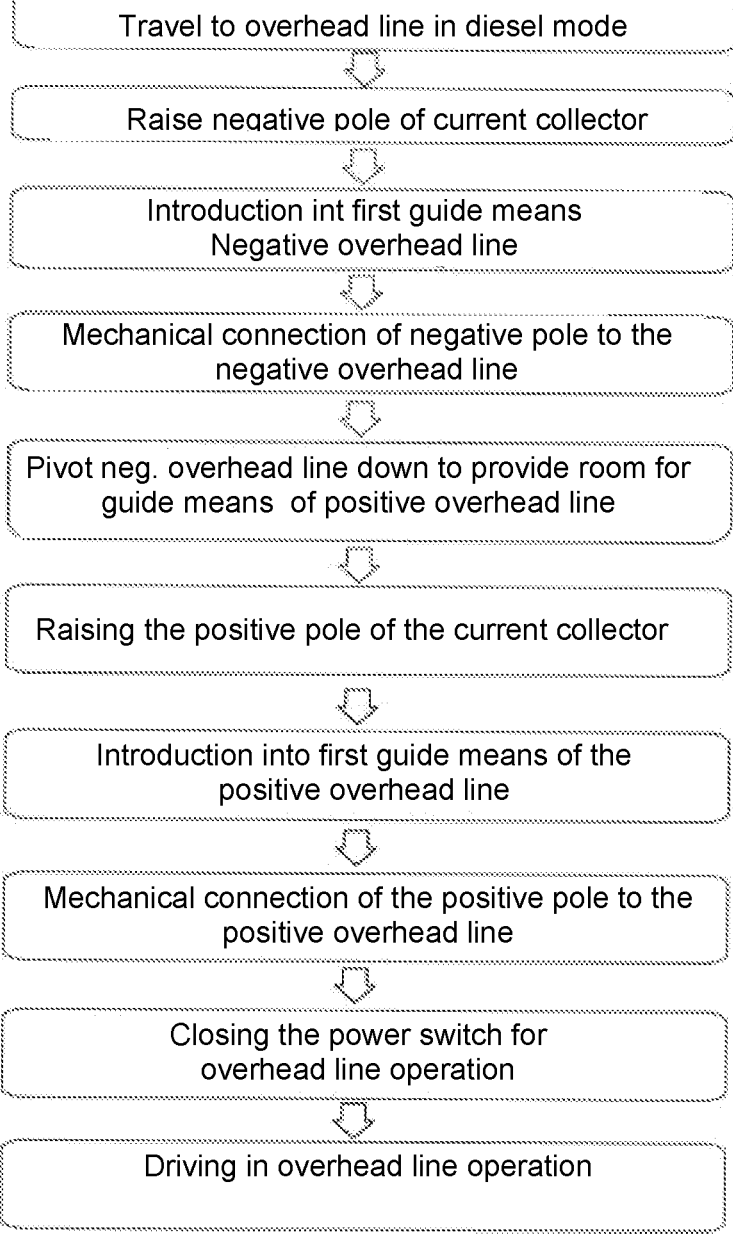
FIG. 5a: the flowchart diagram during the switchover of the construction machine from diesel-electric transmission to overhead line drive with an overhead line system having guide aids arranged offset.

The basic routine during the transition from diesel-electric transmission mode into overhead line mode can be seen from the flowchart of FIG. 5a. In the first step, the dump truck is first driven by a diesel-electric transmission. Shortly before reaching the starting point of the overhead line 20, the polarity pole 11a for the negative potential is raised first and is brought into mechanical connection with the negative overhead line 21a via the first guide aid 22a. Optionally, the polarity pole 11a is also actively pivoted about the pivot axis extending in parallel with the driving line 21a by means of the corresponding drive for this purpose to facilitate the introduction into the guide aid 22a.

Once the mechanical contact between the negative current pole 11a and the corresponding overhead line 21a has taken place, the polarity pole 11b for the positive potential is subsequently raised and brought into contact with the corresponding overhead line 21b by means of the second guide aid 22b. An active pivoting of the polarity pole 11b about the pivot axis extending in parallel with the drive line 21b can also be helpful here. The operation of the vehicle is subsequently switched over in the power electronics of the dump truck from diesel-electric transmission to overhead line operation by actuating the corresponding power switch or switches, whereby the vehicle can ultimately drive in overhead line operation.

Figures 7, 8:
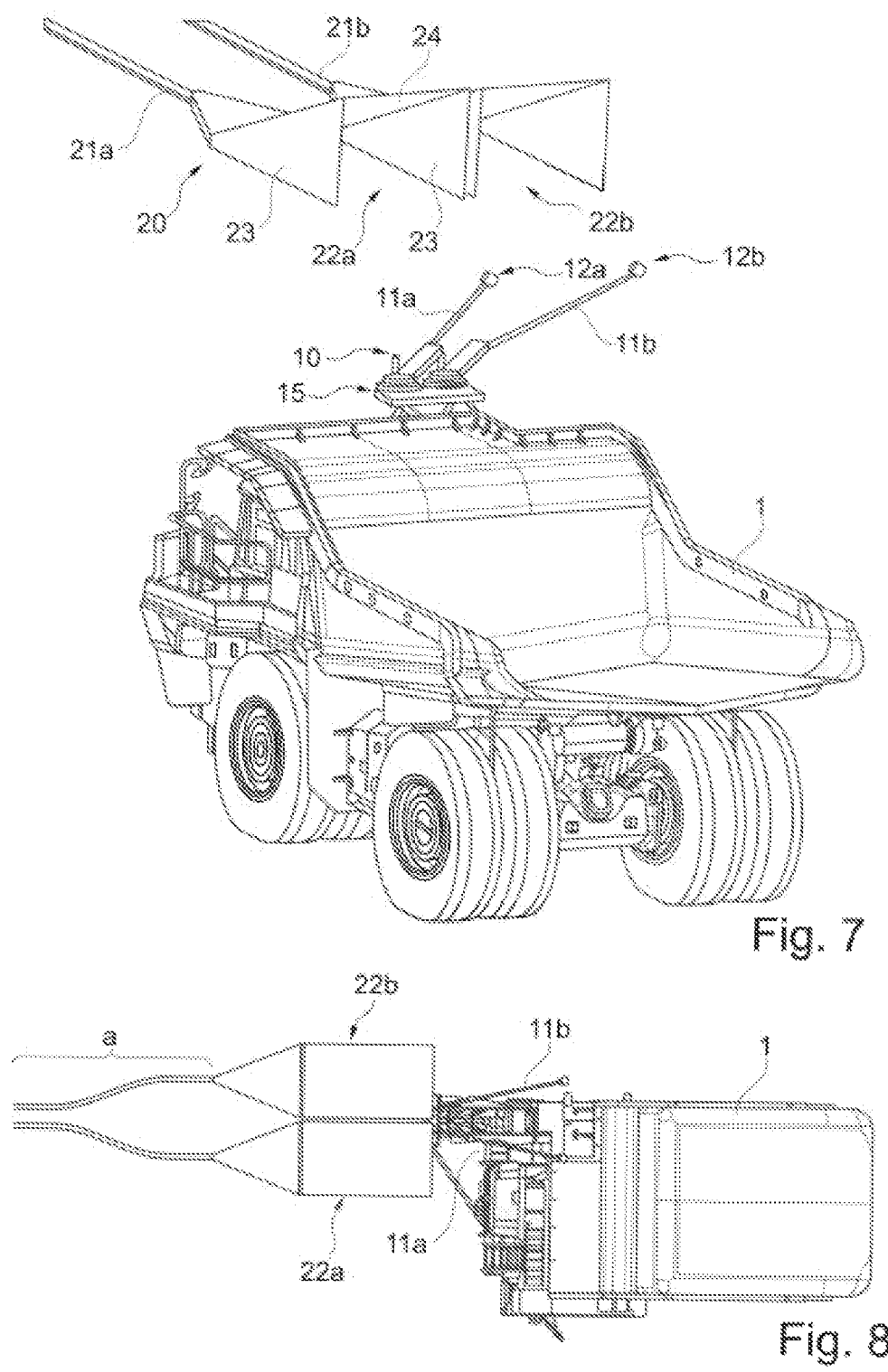
FIG. 7: a further embodiment of the overhead line having the dump truck in accordance with the disclosure.
FIG. 8: the embodiment in accordance with FIG. 7 in a plan view.
Figure 9:
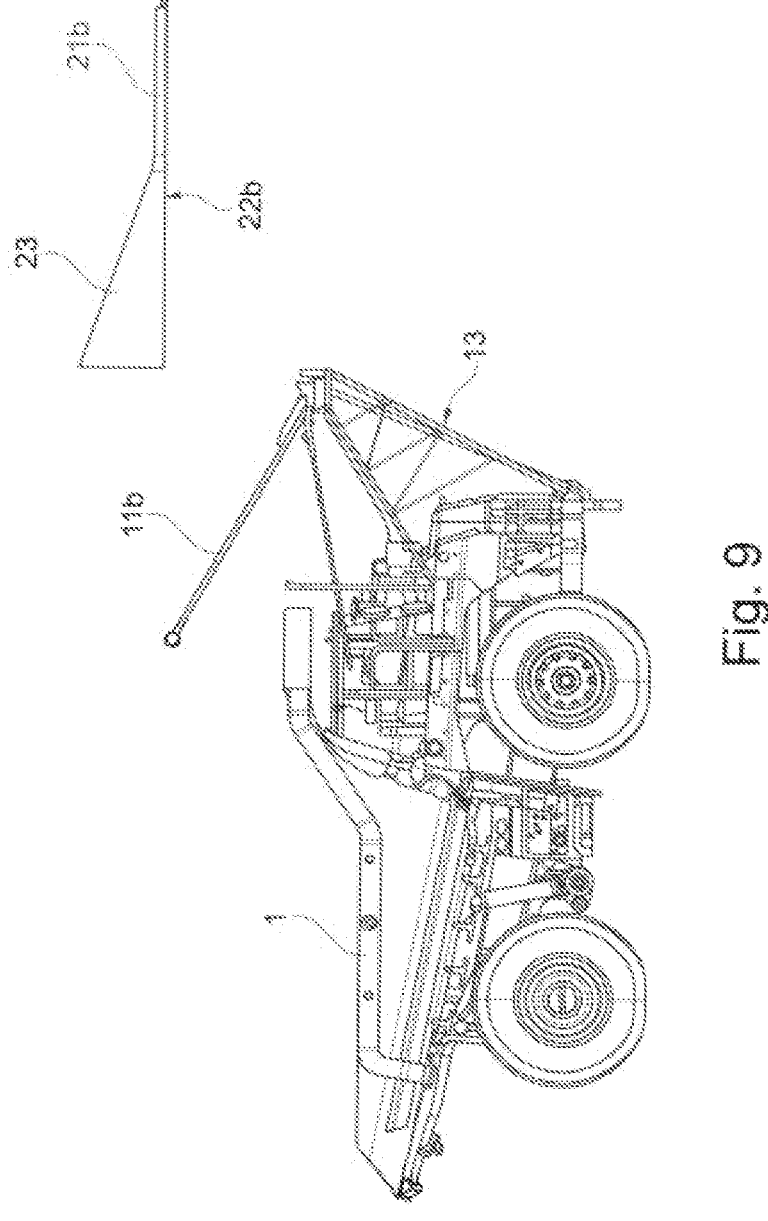
FIG. 9 a side view of the embodiment in accordance with FIGS. 7, 8.

The design of the dump truck in accordance with the disclosure with pole current collectors 10 whose polarity poles 11a, 11b can also be actively displaced both in the vertical direction and in the horizontal direction allows the use of the dump truck for different overhead line systems. An alternative to the variant of FIGS. 1 to 4 is shown in FIGS. 7 to 9. The dump truck shown there is identical to the design in FIGS. 1 to 4. The only difference is in the arrangement of the guide aids 22a, 22b of the overhead line system 20 that are no longer offset in FIGS. 7 to 9, but are rather positioned directly next to one another at the start of the overhead line 20.

It can in particular be seen from the plan view of FIG. 8 that the spacing of the lines 21a, 21b at the start of the overhead line, marked as section a in FIG. 8, has to be considerably larger for such an arrangement to also be able to implement a channel opening of the guide aids 22a, 22b that is as large as possible in this embodiment. Since the spacing of the polarity poles 11a, 11b is typically adapted to the standard spacing of the overhead line 20, the polarity poles 11a, 11b have to be actively pivoted outwardly about the pivot axis of the polarity pole support extending in parallel with the line 21a, 21b before the introduction into the guide aids 22a, 22 or before the contact with the lines 21a, 21b. A position of the polarity poles 11a, 11b pivoted by approximately 1 degrees can be seen in FIGS. 7 to 9. Contrary to the embodiment in FIGS. 1 to 4, the polarity poles are dynamically aligned during the trip and are simultaneously contacted with the respective overhead lines 21a, 21b.

Figure 3B:
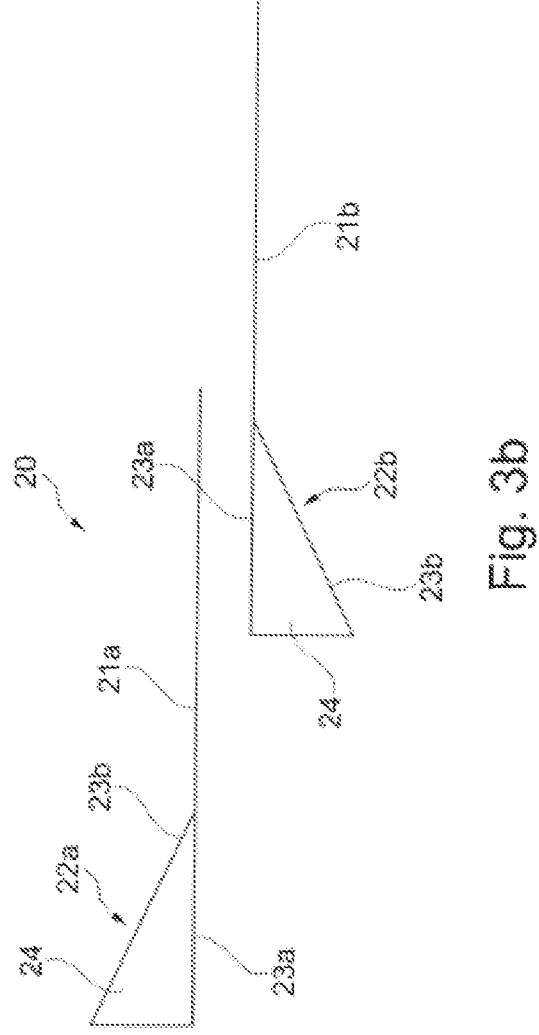
FIG. 3b: a plan view of the overhead line in accordance with a modified variant.
Figure 4:
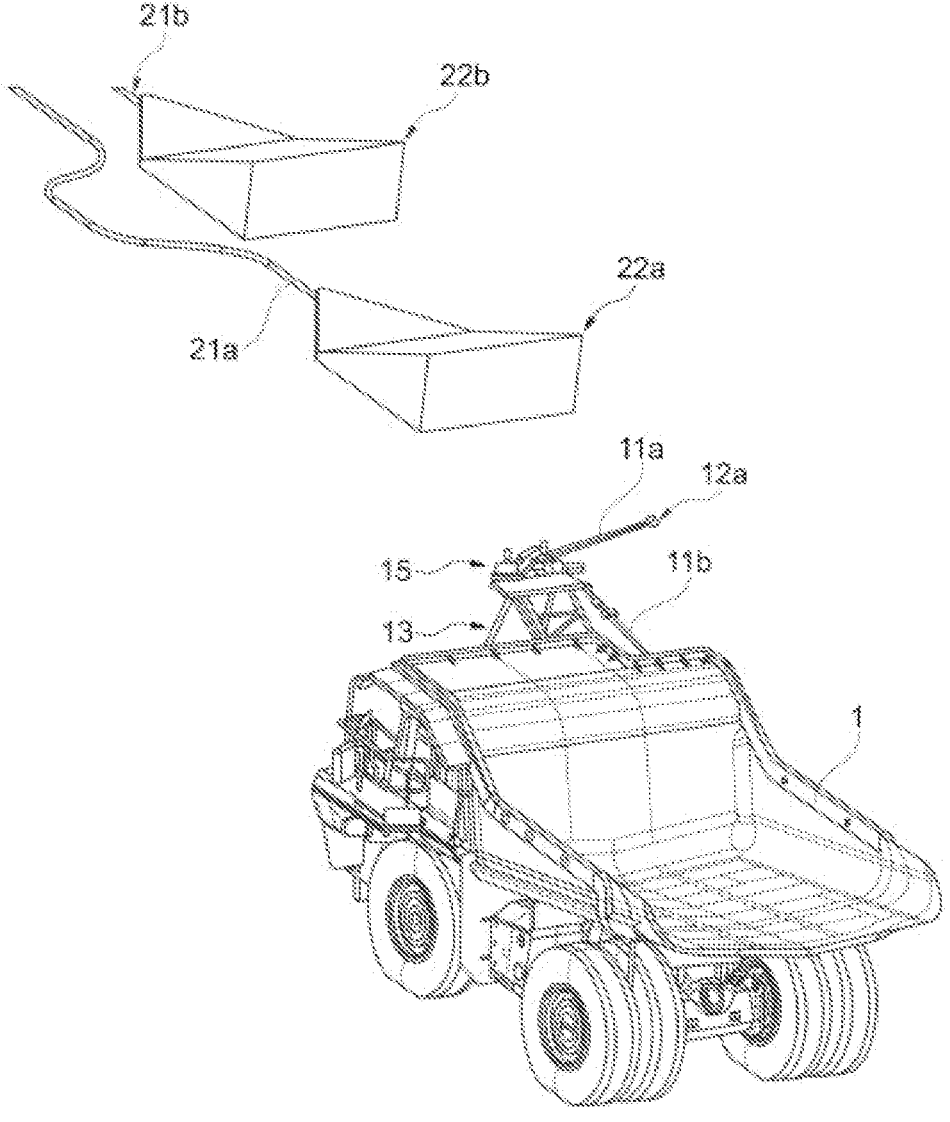
FIG. 4: a rear view of the dump truck in accordance with FIGS. 1 to 3.
Figure 10:
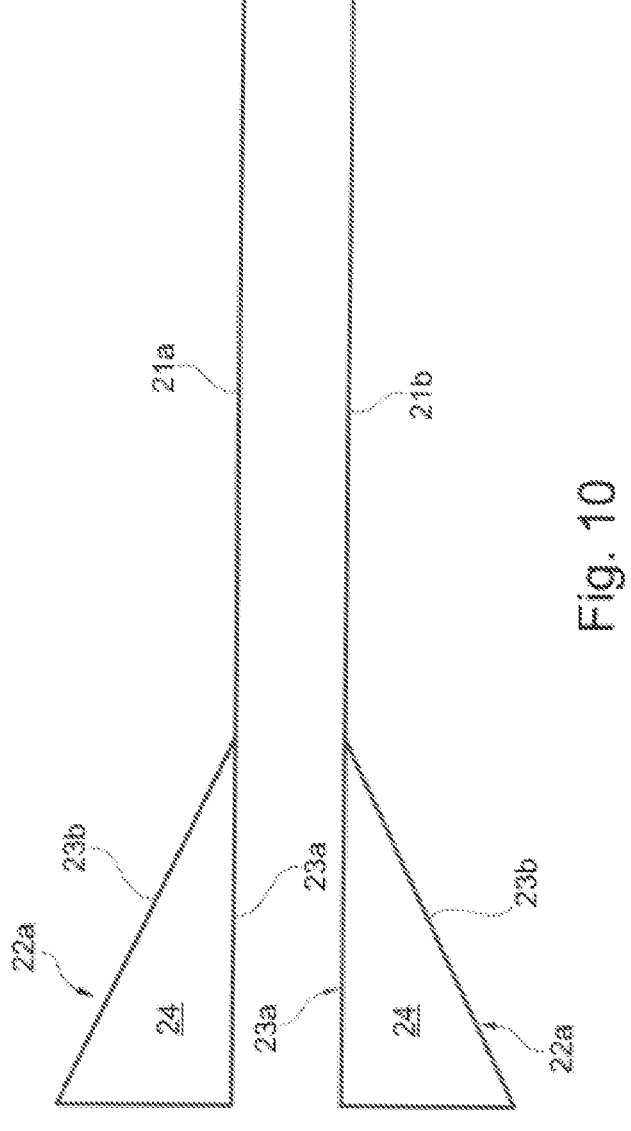
FIG. 10 a further modification of the overhead line system.

The corresponding counterpart to the modification of FIG. 3b is shown in FIG. 10. In the embodiment of the guide aids 22a 22b there, only the outer side wall 23b runs from the outside to the inside while the inner side wall 23a extends in parallel with the overhead line 21a, 21b. As in the embodiment of FIGS. 7 to 9, the guide aids 22a, 22b are arranged in parallel next to one another here. Since the channel here, however, only widens to the outside, the spacing of the overhead lines 21a, 21b from one another can remain constant over the total extent, but at least in the region of the guide aids 22a, 22b.

The basic routine during the transition from diesel-electric transmission mode into overhead line operation in an embodiment, of the overhead line system in accordance with FIGS. 7 to 10 to in accordance with FIG. 10 can be seen from the flowchart of FIG. 5b. In the first step, the dump truck is first driven by a diesel-electric transmission. Shortly before reaching the starting point of the overhead line 20, both polarity poles 11a, 11b are simultaneously raised and are brought into mechanical connection with the overhead line pair 21a, 21b via associated guide aids 22a, 22b. Optionally, the polarity poles 11a, 11b are also actively pivoted about the pivot axis extending in parallel with the driving line 21a, 21b by means of the corresponding drive for this purpose to facilitate the introduction into the guide aid 22a, 22b. Once the acknowledgment of the proper mechanical contact has taken place, the establishing of the electric connection between the overhead line having negative polarity and the vehicle electronics first takes place. The electric connection with the positive polarity then takes place offset in time. The operation of the vehicle is subsequently switched over in the power electronics of the dump truck from diesel-electric transmission to overhead line operation by actuating the corresponding power switch or switches, whereby the vehicle can ultimately drive in overhead line operation.

Figure 6A:
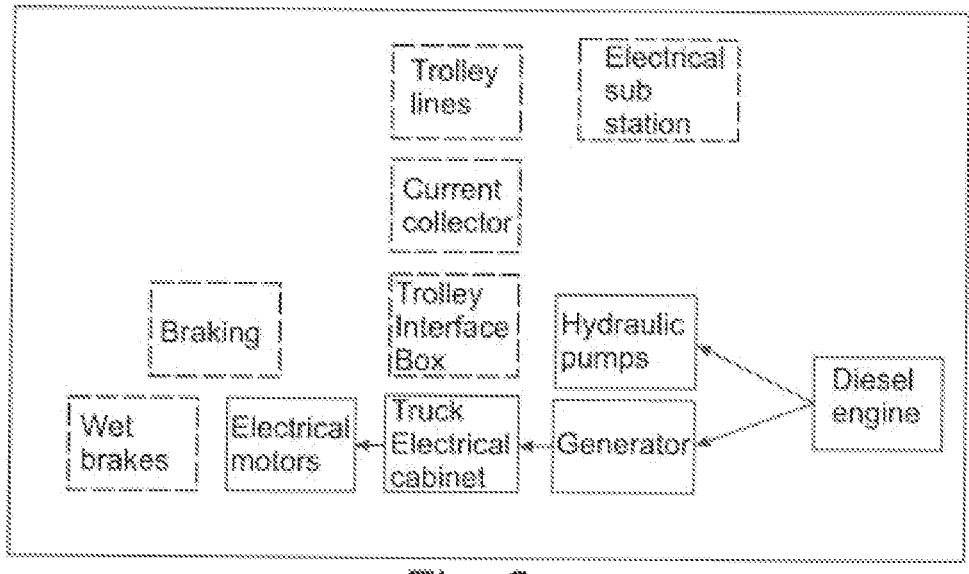
FIGS. 6a to 6e: different block diagrams to illustrate the power flow of the dump truck during its different operating modes.
Figure 6B:
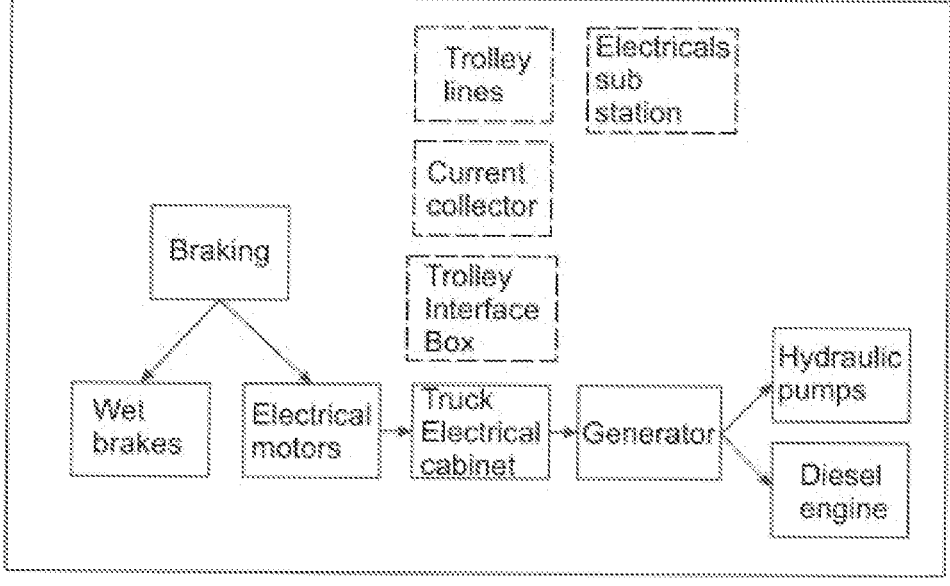
Figure 6C:
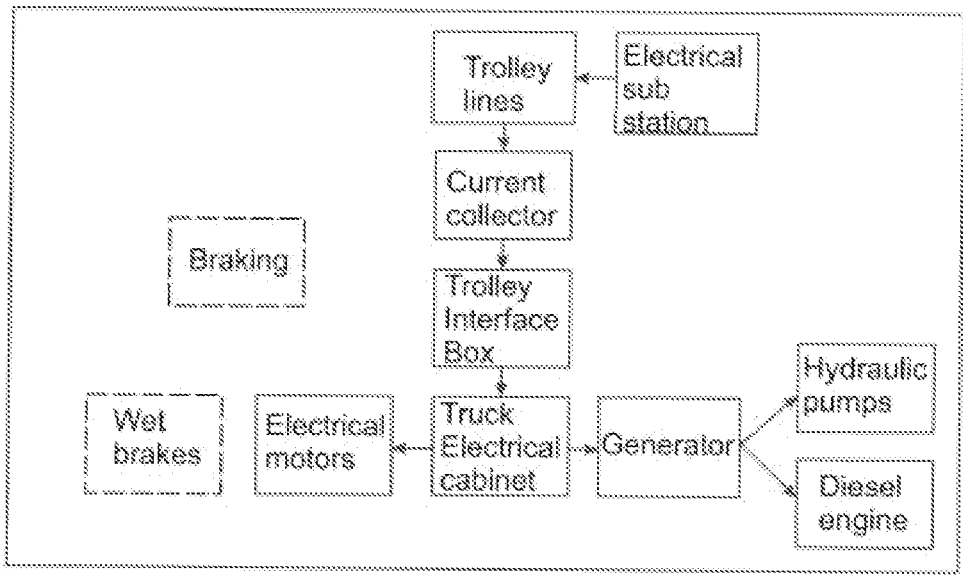

The corresponding power flow during the different operating states of the dump truck is marked in FIGS. 6a to 6c. FIG. 6a here shows regular diesel-electric driving operation during which the diesel unit drives both the hydraulic pumps and the generator, with the latter feeding the electric drive motors at a corresponding switch position of the power electronics.

On the braking of the vehicle in diesel-electric driving operation, the braking effect is also achieved, in addition to a conventional mechanical brake, by the electric drive motors acting in generator operation. The recuperated generator energy is provided back to the actual generator via the power electronics, with the former assisting the drive of the motor shaft and/or of the hydraulics as an electric motor (see FIG. 6b).

FIG. 6c now shows the driving operation of the vehicle via the overhead line supply. The electric energy from the power electronics is provided to both the electric drive motors and the generator via the current collectors 10 and the corresponding control unit that effects the automatic actuation of the current collector poles 11a, 11b, with the generator likewise acting in an assisting manner on the hydraulic pump or on the diesel unit in engine operation. During mountain driving, the electric system also assists the mechanical/hydraulic system via the generator; the internal combustion engine only runs at a minimal speed. Fuel is thereby saved.

Figure 6D:
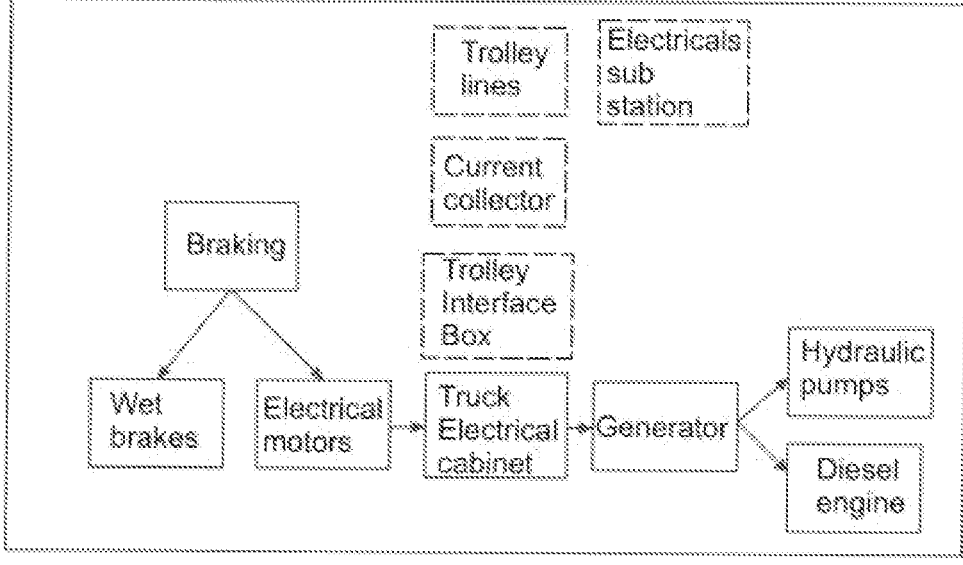
Figure 6E:
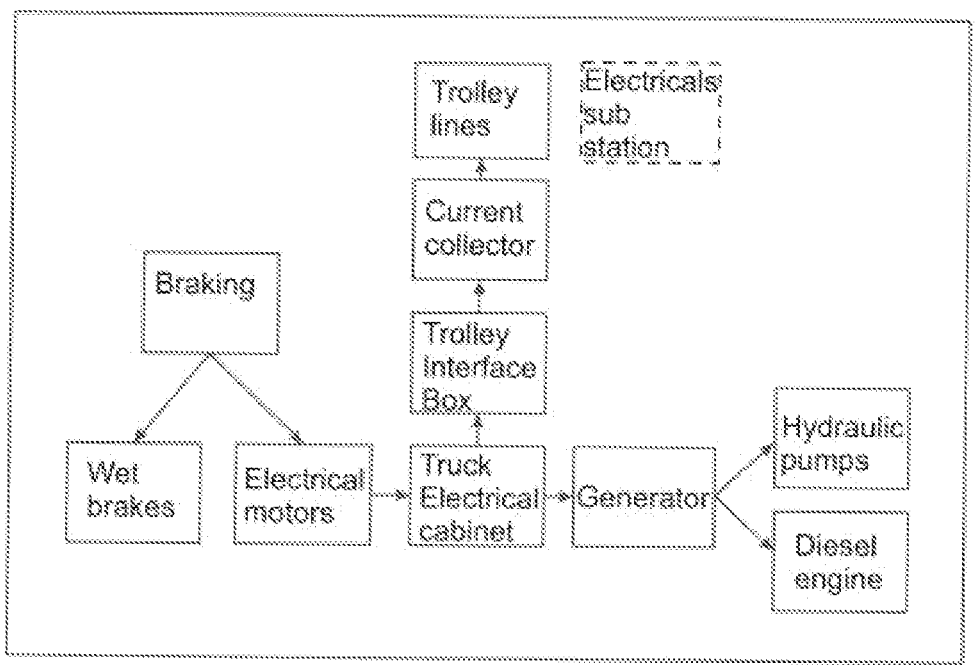

FIGS. 6d, 6e show different recuperation processes on the braking of the vehicle, in particular during the descent. In accordance with the embodiment in FIG. 6d, the electric energy recovered during the generator braking by the electric motors is provided to the actual generator, as in FIG. 6b, that then assists the drive of the diesel engine shaft and/or of the hydraulics as an electric motor. An energy return flow into the overhead line system does not take place here. In contrast to this, in the embodiment in accordance with FIG. 6e, the energy recovered by the braking effect is also fed back into the overhead line system. Alternatively or additionally to tis, the energy could also be buffered in an internal store of the vehicle.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An overhead line system for an electrical supply of a travel drive of one or more construction machines for a transport of unit load and bulk load, wherein the overhead line system comprises at least one line pair of lines that run in parallel along a driving route, that carry current of opposite polarity, and that can be electrically contacted by corresponding current collectors of the one or more construction machines, wherein each line of the at least one line pair of lines is equipped at a respective end side with a respective guide aid forming a supply channel for mounting and guiding a head of a current collector, with the supply channel converging in a direction of the line, the guide aid configured to accommodate the head of the current collector in the supply channel and guide the head along the supply channel until the head contacts the line; and at least one current collector is actively movable in vertical and horizontal directions.

2. The overhead line system in accordance with claim 1, wherein a channel width of the supply channel is reduced in the direction of the line from a front side of the guide aid to an end of the guide aid where the guide aid couples to the end side of the line.

3. The overhead line system in accordance with claim 2, wherein the channel width of each guide aid is defined by two oppositely disposed side walls, with the side walls extending with an identical inclination toward a center axis from outside to inside in direction of the line for a symmetrical reduction of the channel width or with only an outer one of the side walls extending at an incline toward the center axis while an inner one of the side walls extends in parallel with an overhead line axis.

4. The overhead line system in accordance with claim 2, wherein the channel width of the supply channel of at least one guide aid is at least initially larger than regular spacing between the lines extending in parallel.

5. The overhead line system in accordance with claim 1, wherein the respective guide aids of the at least one line pair are arranged at a same level next to one another viewed in a direction of travel.

6. The overhead line system in accordance with claim 5, wherein the respective guide aids of the at least one line pair are arranged offset from one another in the direction of travel.

7. The overhead line system in accordance with claim 6, wherein spacing between the lines extending in parallel is enlarged in a region of at least one guide aid.

8. The overhead line system in accordance with claim 7, wherein a visual mark is provided on a floor in the region of at least one guide aid for an operator of the one or more construction machines to assist the operator in introduction of the head of each current collector into a corresponding guide aid.

9. The overhead line system in accordance with claim 7, wherein the spacing between the lines extending in parallel is enlarged by a lateral leading away of a line section of a first line that extends in parallel with a guide aid of a second line.

10. A construction machine having an electric travel drive and current collectors suitable for setting up an electrical connection to the overhead line system in accordance with claim 1, wherein at least one current collector is actively movable in the vertical and horizontal directions.

11. The construction machine in accordance with claim 10, wherein each current collector is actively movable in the vertical and horizontal directions via corresponding drives during the setting up of the electrical connection, and wherein the current collectors provide a passive adjustment possibility in the horizontal direction and/or vertical direction, with a passive adjustment only taking place after a successful mechanical contact of the current collectors with the overhead line during overhead line operation of the construction machine to ensure a contact pressure of the current collectors at the overhead line that is as constant as possible.

12. The construction machine in accordance with claim 11, wherein a control unit is provided that controls raising, lowering, and centering of the heads of the current collectors in an automated manner during travel movement.

13. The construction machine in accordance with claim 12, wherein the construction machine comprises a diesel-electric travel drive and the control unit is designed such that a switchover is made between diesel-electric and electric travel drive of the vehicle if the at least one current collector is in contact with the overhead line system, and wherein electrical energy of the overhead line system is supplied to the electric travel drive when the at least one current collector is in contact with the overhead line system and while the construction machine is traveling.

14. The construction machine in accordance with claim 10, wherein the current collectors are arranged at a front of the construction machine and/or laterally offset from an operator's cabin of the construction machine.

15. The construction machine in accordance with claim 14, wherein one or more mirrors and/or camera/monitor combinations are provided to allow a machine operator a visual monitoring of proper contact of the current collectors with the overhead line system.

16. The construction machine in accordance with claim 10, wherein a projecting roof of the construction machine comprises a corresponding cutout to enable a lowering of heads of the current collectors onto a placement surface disposed beneath the projecting roof to ensure simple maintenance access to the current collectors.

17. The construction machine in accordance with claim 16, wherein an edge of the projecting roof provides a suitable elevated portion or sill in a region of the cutout to protect the heads of the current collectors disposed thereunder from dropping bulk load or unit load.

18. An overhead line system for supplying electricity to a vehicle, comprising:

an overhead line configured to conduct electricity; and a guide aid arranged at a line start of the overhead line, the
   guide aid comprising:
   a pair of triangular side walls; and
   a triangular upper side coupled to the pair of triangular
      side walls,
the guide aid being open at a front side and at a bottom of
   the guide aid, and each triangular side wall of the pair
   of triangular side walls and the upper side each con-
   verge and narrow from the front side to an end of the
   guide aid arranged at the line start, such that the guide
   aid is configured to accept a current collector and guide
   the current collector to mechanically contact the line
   start.

19. The overhead line system of claim 18, wherein the
overhead line is a first overhead line and the guide aid is a
first guide aid, and wherein the overhead line system
includes a second overhead line and a second guide aid
arranged at a line start of the second overhead line, the first
overhead line having a negative potential and the second
overhead line having a positive potential.

20. The overhead line system of claim 18, wherein the
pair of triangular side walls and the triangular upper side
form a supply channel that narrows from the front side in a
direction of the line start such that both a width of the supply
channel and a height of the supply channel reduce in the
direction of the line start.

\* \* \* \* \*